US005538067A

United States Patent [19]

Nakamura et al.

[11] Patent Number: 5,538,067
[45] Date of Patent: Jul. 23, 1996

[54] METHOD AND DEVICE OF PRODUCING A SQUIRREL-CAGE ROTOR FOR AN INDUCTION MOTOR

[75] Inventors: Kosei Nakamura; Yukio Katsuzawa; Michi Masuya; Junichi Nagai, all of Yamanashi, Japan

[73] Assignee: Fanuc Ltd., Yamanashi, Japan

[21] Appl. No.: 302,776

[22] PCT Filed: Jan. 21, 1994

[86] PCT No.: PCT/JP94/00082

§ 371 Date: Sep. 20, 1994

§ 102(e) Date: Sep. 20, 1994

[87] PCT Pub. No.: WO94/17581

PCT Pub. Date: Aug. 4, 1994

[30] Foreign Application Priority Data

Jan. 22, 1993 [JP] Japan .................................. 5-009406

[51] Int. Cl.$^6$ ........................................... B22D 19/12
[52] U.S. Cl. ........................ 164/112; 164/333; 164/334
[58] Field of Search ................................ 164/112, 332, 164/333, 334, 113, 312

[56] References Cited

U.S. PATENT DOCUMENTS 5,067,550 11/1991 Maekawa et al. ....................... 164/120

FOREIGN PATENT DOCUMENTS 55-127869 10/1080 Japan .
58-224548 12/1983 Japan .
63-124747 5/1988 Japan .

OTHER PUBLICATIONS

DE-A-25 36 142 (Int Press Dev Est) 26 Feb. 1976 p. 3, line 23-p. 5, line 20; figures 2-4.
Patent of Abstracts of Japan, vol. 015, No. 397 (E-1120) 8 Oct. 1991, (abstract).
JP-A-03 159546 (Mitsubishi Electric Corp) 9 Jul. 1991 (abstract).

*Primary Examiner*—Kuange Y. Lin
*Attorney, Agent, or Firm*—Nikaido, Marmelstein, Murray & Oram

[57] ABSTRACT

A holding member (22) which can hold a predetermined axial-length laminated core member by pressing down both axial end faces thereof is used to hold a short laminated core member (24) and a spacing element (48) having a thickness generally equal to the difference between the axial lengths of those laminated core members. The spacing element is disposed at a position between one axial end face of the laminated core member (24) and a lid element (32) of the holding member (22). The laminated core member (24) and the spacing element (48) are both held by the holding member (22) and are introduced into the mold (20) to form a conductor portion integrally with a predetermined axial-length laminated core member held by the holding member (22). In this state, molten metal is poured into slots (38) of the laminated core member (24) and annular cavities (44, 46), and thus a conductor portion is formed integrally with the laminated core member (24) when the molten metal is set.

7 Claims, 7 Drawing Sheets

METHOD AND DEVICE OF PRODUCING A SQUIRREL-CAGE ROTOR FOR AN INDUCTION MOTOR

TECHNICAL FIELD

The present invention relates to a method of producing a squirrel-cage rotor for an induction motor, and more particularly to a method of producing a squirrel-cage rotor wherein a conductor portion is integrally formed within a laminated core member by a casting process. Also, the present invention relates to a device for carrying out this method.

BACKGROUND ART

In the field of induction motors, a cast squirrelcage rotor, which includes a laminated core member made by stacking magnetic laminations, and a conductor portion integrally formed with the laminated core member by pouring molten metal, such as molten aluminum or copper, into a plurality of slots provided in the laminated core member, is well known. Such a cast squirrel-cage rotor has the advantage of good productivity, and thus is frequently used in induction motors as, e.g., drives for machine tools.

One example of a conventional casting process for a squirrel-cage rotor is described below with reference to FIG. 6a. In this casting process, a plurality of laminations forming a laminated core member 1, are held by a holding member 2 in a laminated state, and then are placed together with the holding member 2 in a mold 3. Thereby, axially extending slots 4 are formed at an outer periphery of the laminated core member 1. Also, balancing ring members 5 are generally arranged for ensuring a rotor balance at respective axial ends of the laminated core member 1. The outer diameters of the balancing ring members 5 are smaller than the outer diameter of the laminated core member 1, whereby annular cavities 6 for communicating the cavities of the slots 4 with each other are formed at respective axial ends of the laminated core member 1 placed in the mold 3.

The laminated core member 1 accommodated in the mold 3 is positioned in such a manner that, e.g., the axis thereof is vertically oriented. Then, molten metal is poured, at a predetermined pressure, into the mold cavity through a gate 8 from a molten-metal pouring opening 7 located beneath the laminated core member 1. In this case, the molten metal flows in a direction opposite to gravity and successively fills one (lower) annular cavity 6, slots 4, and the other (upper) annular cavity 6, whereby secondary conductors in slots 4 and end rings in annular cavities 6 are respectively formed integrally with the laminated core member 1. The mold 3 is provided with a plurality of air-vents 9 for communicating the other (upper) annular cavity 6 with the outside of the mold.

The holding member 2 for holding the laminated core member 1 includes a sleeve element 10 extending through a shaft bore of the laminated core member 1, and a lid element 11 joined to one end of the sleeve element 10. The sleeve element 10 and the lid element 11 are provided with radially extending flanges 12 and 13, respectively. Therefore, when the sleeve element 10 and the lid element 11 are firmly fastened together by a fastening means 14 such as a bolt, the flanges 12, 13 hold the laminated core member 1 in a laminated state through the balancing ring members 5.

In the conventional casting process, the distance between the flanges of the holding member for holding the laminated core member corresponds to the axial length of the laminated core member and, if necessary, a pair of balancing ring members, as mentioned above. Therefore, in the case of forming squirrel-cage rotors having different axial lengths by casting, it has been necessary to prepare different holding members and different molds corresponding to the axial lengths of the rotors. FIG. 6b shows, by way of example, a holding member 2' and a mold 3' for carrying out a casting process to a laminated core member 1' which has an axial length shorter than that of the laminated core member 1 of FIG. 6a.

Generally, the output of an induction motor is proportional to the value of the resistance of a secondary conductor, so that it is possible to form various kinds of induction motors having different outputs, by modifying the axial length of the squirrel-cage rotor. However, it is not preferred to prepare many kinds of holding members and molds so as to be able to form rotors corresponding to all desired outputs, because this increases the production cost by increasing the cost of the equipment. Thus in the past, in order to produce induction motors having different outputs, rotors having same axial length were used and the outputs were changed by modifying the electric characteristics.

When the output of an induction motor is changed by merely modifying the electrical characteristics, problems arise in which, e.g., the weight and the output of the core are not balanced according to rotor size, and the acceleration time is increased. Recently, in, e.g., an induction motor for driving a spindle of a machine tool, good acceleration properties have been desired to reduce processing time, and thus it has become necessary to use a rotor having an optimum size corresponding to the required output. However, as mentioned above, when many kinds of laminated core members corresponding to various outputs are produced, the problem of an increase in the production cost due to the cost of equipment must be overcome.

DISCLOSURE OF THE INVENTION

An object of the present invention is to provide a method, of producing cast squirrel-cage rotors, which can produce rotors having optimum axial lengths corresponding to different motor outputs without increasing the production cost. Another object of the present invention is to provide a device for carrying out such a method.

To accomplish the above objects, the present invention provides a method of producing a squirrel-cage rotor for an induction motor, which includes a laminated core member made by stacking magnetic laminations and a conductor portion formed integrally with the laminated core member, comprising the steps of:

a) providing a holding member which can hold a predetermined axial-length laminated core member by pressing down upon both axial end faces thereof;

b) providing a mold which can accommodate the holding member holding the predetermined axial-length laminated core member so as to define a cavity corresponding to a conductor portion to be formed integrally with the laminated core member;

c) fitting a short laminated core member having an axial length shorter than the predetermined axial-length laminated core member to the holding member in such a manner as to define a cavity corresponding to a desired conductor portion when the laminated core member is accommodated in the mold;

d) disposing a spacing element having an axial length generally equal to the difference between the axial lengths of the predetermined axial-length laminated core member and the shorter laminated core member at a position between one axial end face of the shorter laminated core member and a portion of the holding member opposed to the one axial end face, so that the shorter laminated core member and the spacing element are held by the holding member;

e) introducing the shorter laminated core member and the spacing element, both held by the holding member, into the mold in such a manner as to define the cavity corresponding to the desired conductor portion;

f) pouring a molten metal into the cavity corresponding to the desired conductor portion defined in the mold; and g) setting the molten metal in the mold so that the desired conductor portion is integrally formed with the shorter laminated core member.

According to this method, the spacing element held by the holding member together with the shorter laminated core member surely transfers the holding force generated by the holding member to the shorter laminated core member so as to hold it in a laminated state, and also surely transfers the pouring pressure of the molten metal in a casting process to the holding member so as to enable casting with high accuracy. Therefore, it is possible to form, with high accuracy, a desired conductor portion integrally with the shorter laminated core member by utilizing a mold and a holding member used for carrying out a casting process with a predetermined axial-length laminated core member.

In a preferred embodiment, the step c) may include a step of arranging balancing ring members in contact with respective axial end faces of the shorter laminated core member. Also, the step d) may include a step of disposing a plurality of spacing elements having different shapes and dimensions at a position between one axial end face of the shorter laminated core member and a portion of the holding member opposed to the one axial end face.

According to another aspect of the present invention, a device for producing a squirrel-cage rotor for an induction motor including a laminated core member made by stacking magnetic laminations and a conductor portion formed integrally with the laminated core member, which comprises a holding member which can hold a predetermined axial-length laminated core member by pressing down upon both axial end faces thereof; a mold which can accommodate the holding member holding the predetermined axial-length laminated core member so as to define a cavity corresponding to a conductor portion to be formed integrally with the laminated core member; and a spacing element having an axial length generally equal to a difference between the axial lengths of the predetermined axial-length laminated core member and a shorter laminated core member having an axial length shorter than the predetermined axial-length laminated core member, the spacing element being disposed at a position between one axial end face of the shorter laminated core member and a portion of the holding member opposed to the one axial end face so as to be held together with the shorter laminated core member by the holding member; whereby the shorter laminated core member and the spacing element both held by the holding member are accommodated in the mold in such a manner that a cavity corresponding to a desired conductor portion is defined, and the desired conductor portion is formed integrally with the shorter laminated core member by pouring a molten metal into the cavity.

The above-mentioned device may comprise a plurality of spacing elements, having different shapes and dimensions, and disposed in a mutually adjacent manner at a position between one axial end face of the shorter laminated core member and a portion of the holding member opposed to the one axial end face. Also, it is preferred that a heat treatment is applied onto an axial end face of the spacing element, the axial end face being opposed to the shorter laminated core member. Further, an axially extending groove may be provided on an outer surface of the spacing element. This groove may be effectively used for smoothly draining air from the cavity of the mold in the casting process.

BRIEF DESCRIPTION OF THE DRAWINGS

The foregoing and the other objects, features, and advantages of the present invention will be described with reference to the embodiments shown in the accompanying drawings, in which;

FIG. 6b is a sectional elevation view of another laminated core member produced by a conventional method while using the mold and holding member different from those shown in FIG. 6a.

BEST MODE OF CARRYING OUT THE INVENTION

Figure 1:
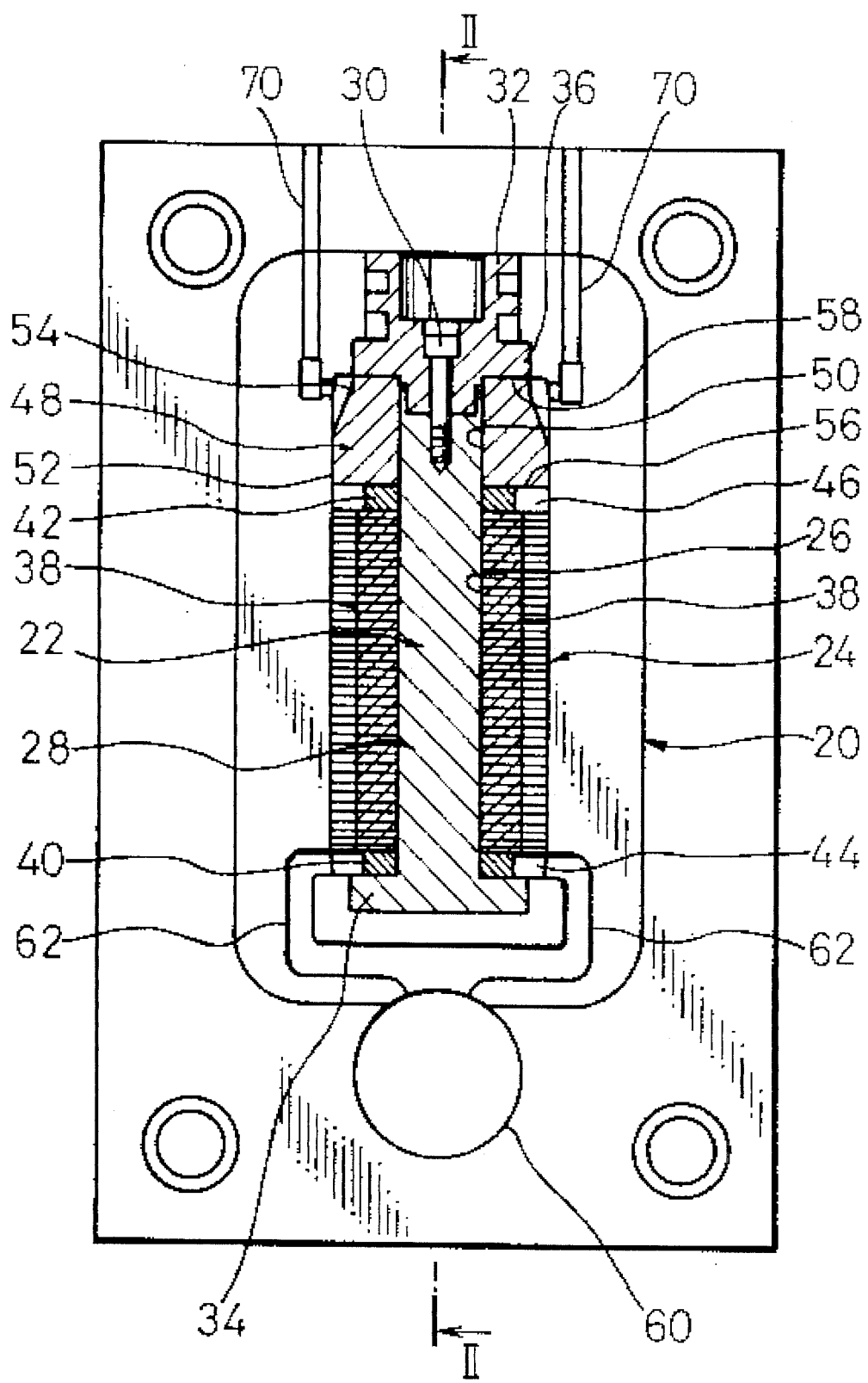
FIG. 1 is a sectional elevation view of a laminated core member produced by a method according to an embodiment of the present invention, shown with a mold, a holding member and a spacing element.
Figure 6A:
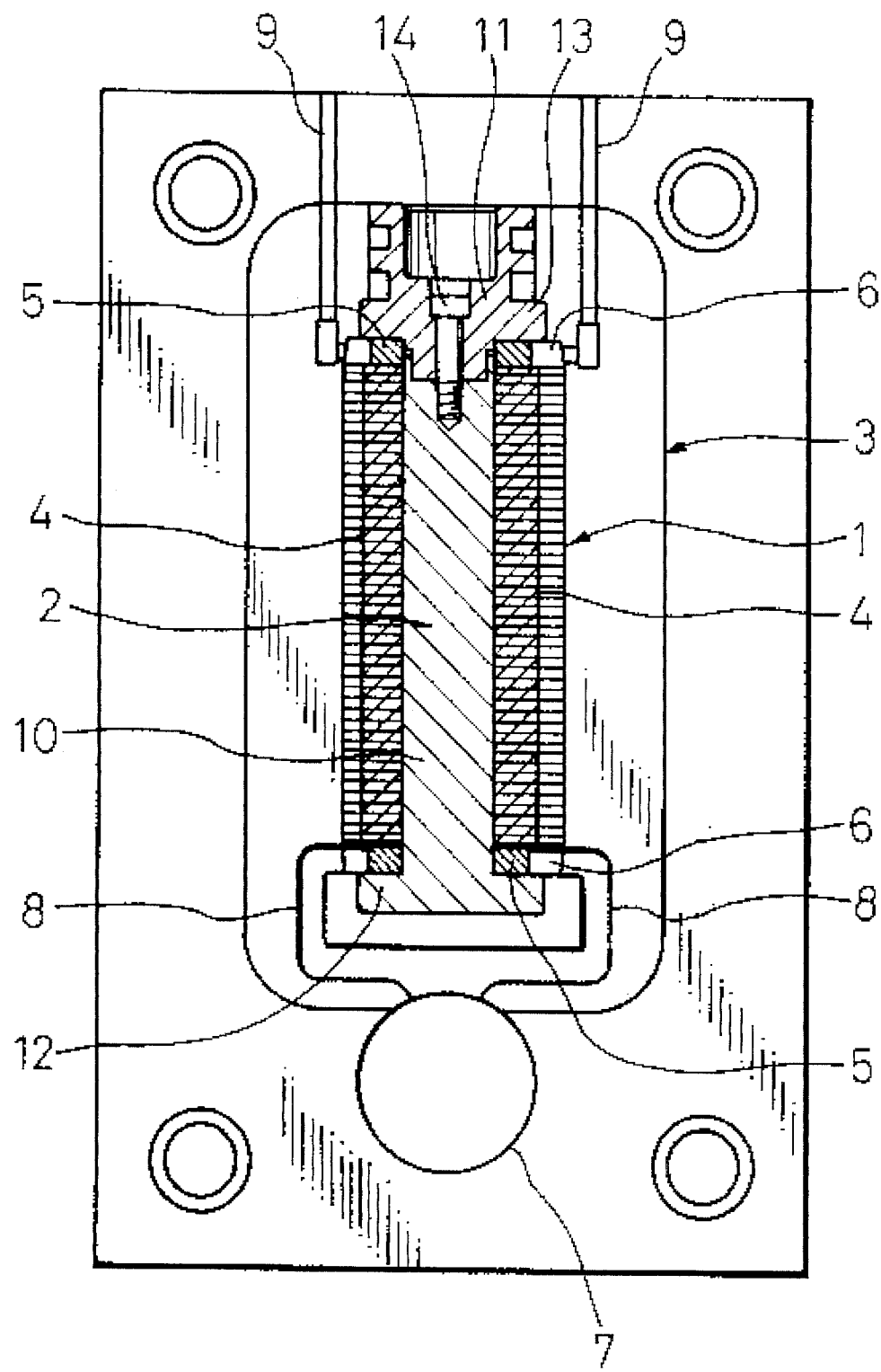
FIG. 6a is a sectional elevation view of a laminated core member produced by a conventional method while using the same mold and holding member as shown in FIGS. 1 and 5.
Figure 6B:
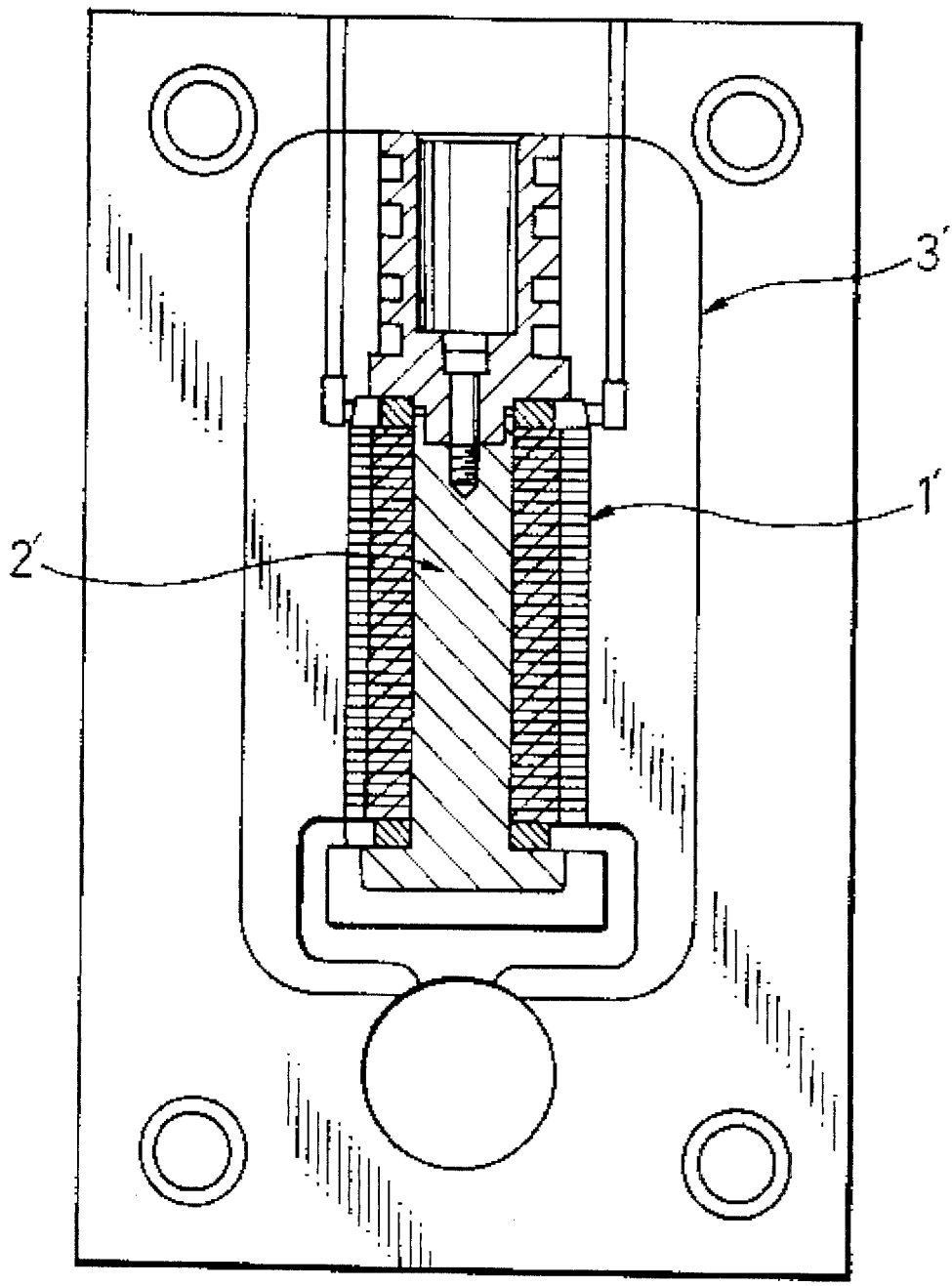

Referring to the drawings, FIG. 1 shows a mold 20 for carrying out a production method according to the embodiment of the present invention, and a laminated core member 24 held by a holding member 22 and placed within the mold 20. To facilitate understanding, it is supposed that the mold 20 and the holding member 22 have the same shapes and dimensions as the mold 3 and the holding member 2 shown as a prior art in FIG. 6a. It is also supposed that the laminated core member 24 has the same shapes and dimensions as the shorter laminated core member 1' produced by a prior art shown in FIG. 6b.

The holding member 22 includes a generally cylindrical sleeve element 28 which is adapted to be inserted into a shaft bore 26 of the laminated core member 24, and a lid element 32 which is adapted to be joined to one end of the sleeve element 28 by a fastening means 30 such as a bolt. The other end of the sleeve element 28 is provided with a radially extending flange 34, and the lid element 32 is also provided with a similar flange 36. Therefore, the holding member 22 holds in a laminated state the laminated core member 24 made by stacking magnetic laminations due to the cooperation of the flange 34 of the sleeve element 28 and the flange 36 of the lid element 32.

The laminated core member 24 is provided with a plurality of slots 38 axially extending along the outer periphery thereof in a condition of being held by the holding member 22. Also, balancing ring members 40, 42 (having the same shapes and dimensions as a balancing ring member 5 shown in FIGS. 6a and 6b) are respectively arranged as desired at both axial ends of the laminated core member 24. The balancing ring members 40, 42 are made of an easily processible metallic material such as iron, and are utilized for ensuring the balance of the squirrel-cage rotor upon being operated by, e.g., providing apertures in a subsequent process. The inner diameter of the balancing ring members 40, 42 are generally equal to the inner diameter of the shaft bore 26 of the laminated core member 24, while the outer diameter of the balancing ring members 40, 42 are smaller than the outer diameter of the laminated core member 24. In the casting process, end rings and secondary conductors are formed as a conductor portion in annular cavities 44, 46 formed around the balancing ring members 40, 42 by the difference between the outer diameters, and in the cavities of the slots 38 extending along the outer periphery of the laminated core member 24, respectively.

The total axial length of the laminated core member 24 plus two balancing ring members 40, 42 is shorter than the distance between the flanges 34, 36 of the holding member 22. Therefore, in the conventional method, it is not possible for the holding member 22 to hold the laminated core member 24 and two balancing ring members 40, 42 in a laminated state. In the method of the present invention, it becomes possible for the holding member 22 to firmly hold the laminated core member 24 by using the spacing element mentioned below.

Figure 2:
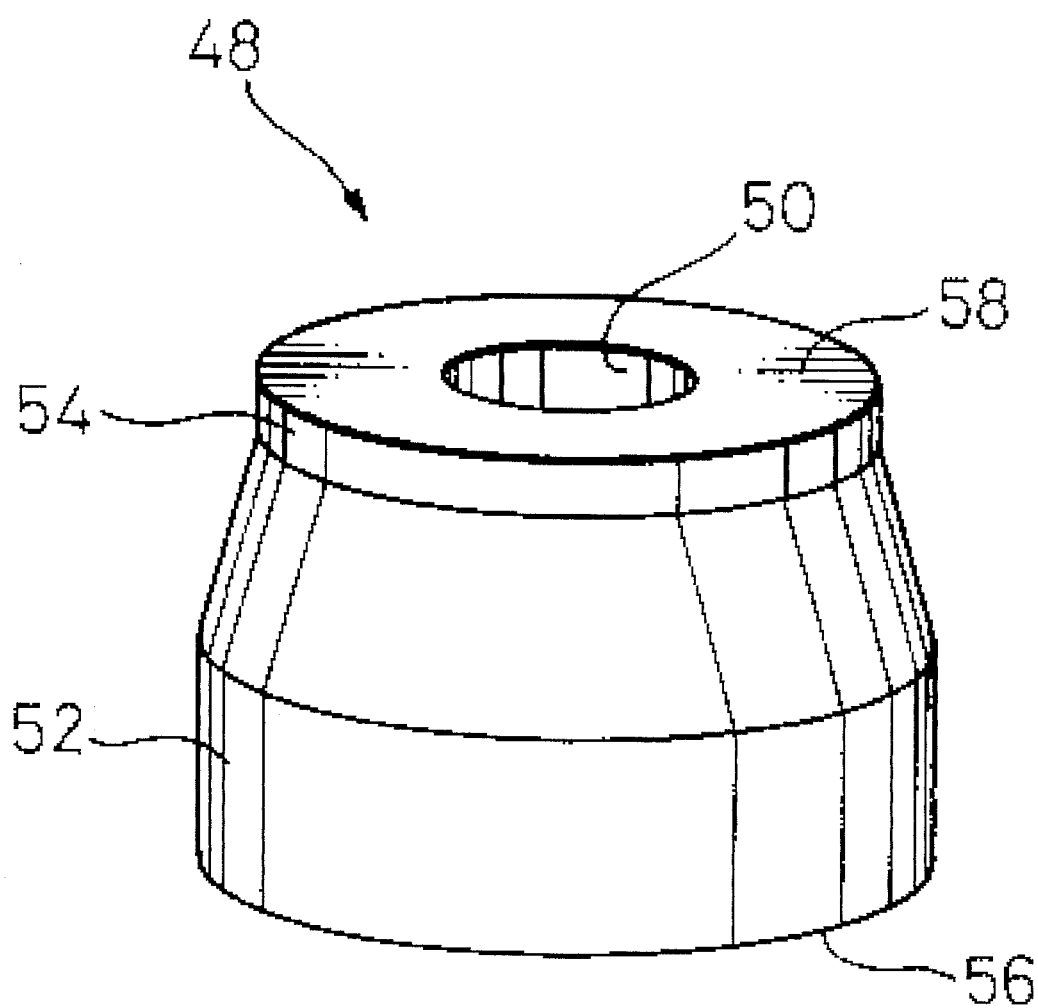
FIG. 2 is an enlarged perspective view of a spacing element shown in FIG. 1.

As shown in FIG. 1, the spacing element 48 is disposed between the balancing ring member 42 at the upper end of the laminated core member 24 and the flange 36 of the lid element 32. The spacing element 48 has preferably a generally truncated-conical shape as shown in FIG. 2, and includes an axially extending center through hole 50 having a diameter generally equal to that of the shaft bore 26 of the laminated core member 24. The thickness (or axial length) of the spacing element 48 is preferably equal to the difference between the total axial length of the laminated core member 24 plus two balancing ring members 40, 42 and the distance between the flanges 34, 36 of the holding member 22, but may be slightly larger than this difference. Further, the spacing element 48 having a generally truncated-conical shape includes a larger diameter portion 52 having an outer diameter generally equal to an outer diameter of the laminated core member 24, and a smaller diameter portion 54 having an outer diameter generally equal to an outer diameter of the flange 36 of the lid element 32.

In the above-mentioned structure, the sleeve element 28 of the holding member 22 is first inserted into the center hole of the balancing ring member 40 so that the balancing ring member 40 is arranged adjacent to the flange 34, and the magnetic laminations for forming the laminated core member 24 are fitted to the sleeve element 28 so as to be stacked on the balancing ring member 40. Then, another balancing ring member 42 is arranged adjacent to the free axial end of the laminated core member 24, and last the sleeve element 28 is inserted into the center through hole 50 of the spacing element 48 so that the spacing element 48 is disposed adjacent to the balancing ring member 42. In this state, the lid element 32 is joined to the end of the sleeve element 28 and is fastened by the fastening means 30, whereby the laminated core member 24, the balancing ring members 40, 42, and the spacing element 48 are firmly held by the holding member 22. At this time, the annular end face 56 of the larger diameter portion 52 of the spacing element 48 is abutted onto the balancing ring member 42 so as to form the annular cavity 46 between the annular end face and the axial end face of the laminated core member 24, and the annular end face 58 of the smaller diameter portion 54 is brought into close contact with the flange 36 of the lid element 32.

The holding member 22 holding the members mentioned above is introduced into a predetermined position of the mold 20 while, e.g., the axis thereof is vertically oriented (see FIG. 1). In this state, molten metal is poured, at a predetermined pressure, into the annular cavity 44 through a gate 62 from a pouring opening 60 located beneath the laminated core member 24. The molten metal flows in a direction opposite to gravity and successively fills the lower annular cavity 44, the slots 38, and the upper annular cavity 46. Then, the molten metal is set, and thereby secondary conductors in slots 38 and end rings in annular cavities 44, 46 are respectively formed integrally with the laminated core member 24.

Figure 3:
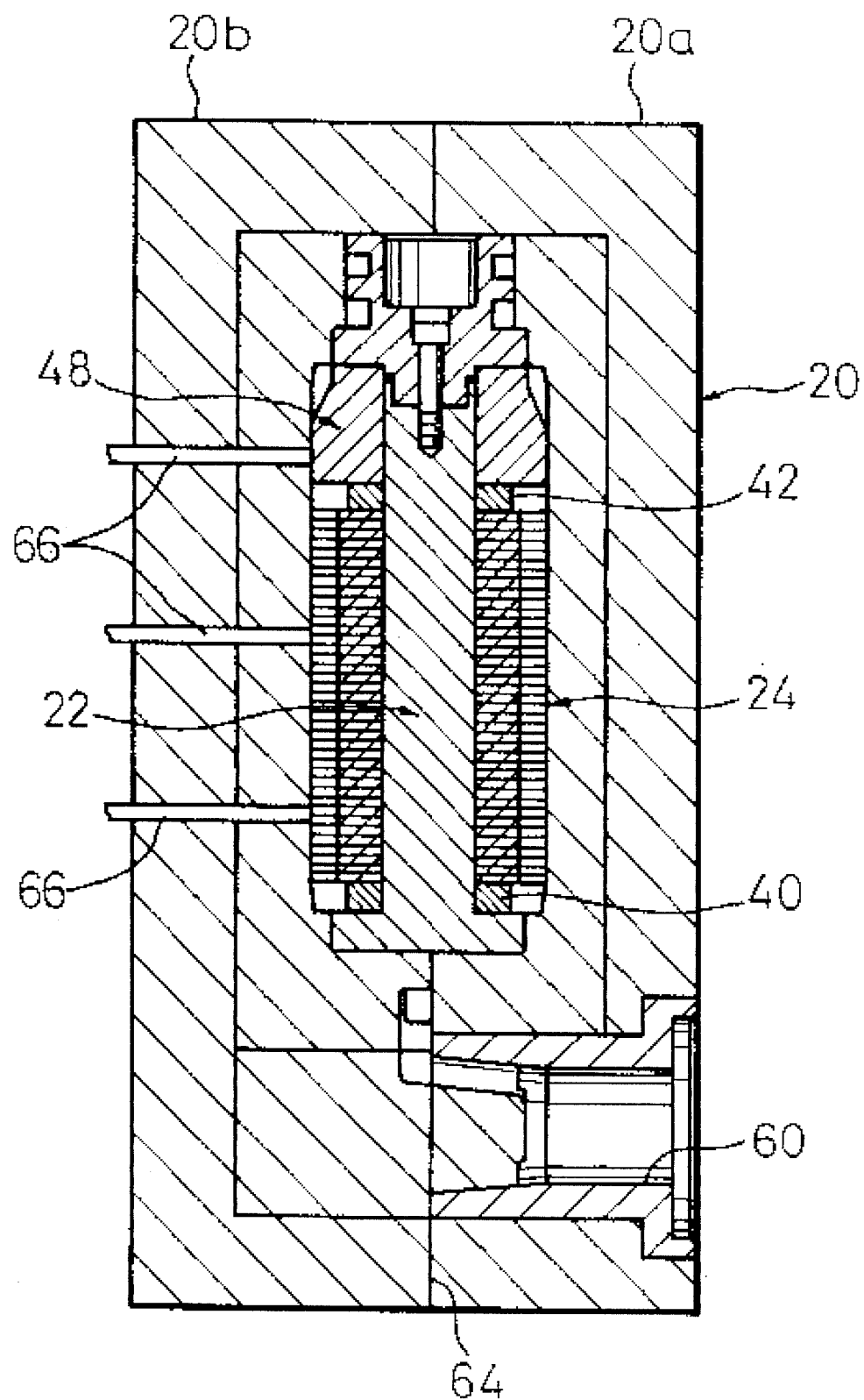
FIG. 3 is a sectional side view taken along line II—II of FIG. 1.

As shown in FIG. 3, the mold 20 includes a stationary mold 20a and a movable mold 20b. After the process has been completed, the movable mold 20b is moved by an operating means (not shown) so that the mold 20 is separated along a separation surface 64. Further, eject pins 66 provided in the movable mold 20b are actuated so that the laminated core member 24 integrally formed with a conductor portion by a casting process is taken out from the mold 20 together with the holding member 22.

The outer diameter of the larger diameter portion 52 of the spacing element 48 may be made to be slightly smaller than the outer diameter of the laminated core member 24 in the order of tens μm so as to form a small gap between the wall of the mold 20 and the spacing element 48, whereby an air draining passage useful upon pouring the molten metal into the mold cavity is ensured. Alternatively, the air draining passage may be formed by providing a plurality of axially extending grooves 68 (see FIG. 4) on the outer peripheral surface of the larger diameter portion 52 of the spacing element 48. These air draining passages are connected with air vents 70 through the space formed between the wall of the mold 20 and the smaller diameter portion 54 of the spacing element 48. This space allows the drained air to pass therethrough, whereby the air is drained more smoothly from the mold cavity in the casting process.

Figure 4A:
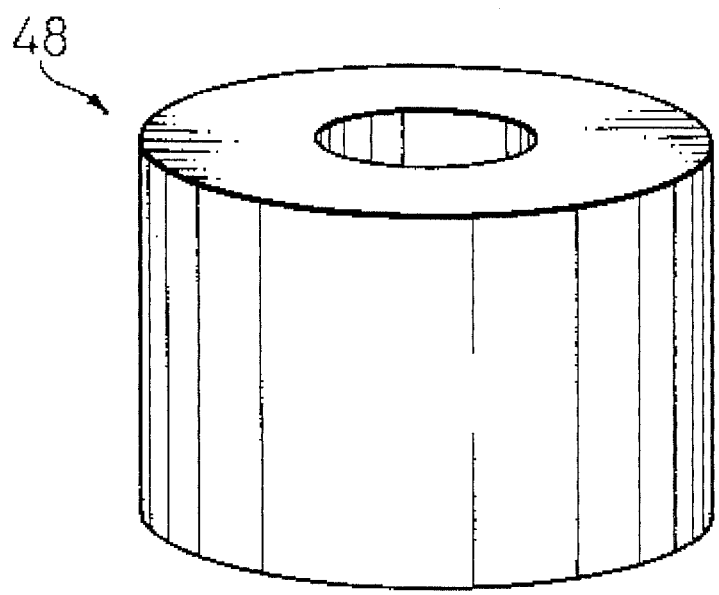
FIG. 4a is an enlarged perspective view of a modification of a spacing element.
Figure 4B:
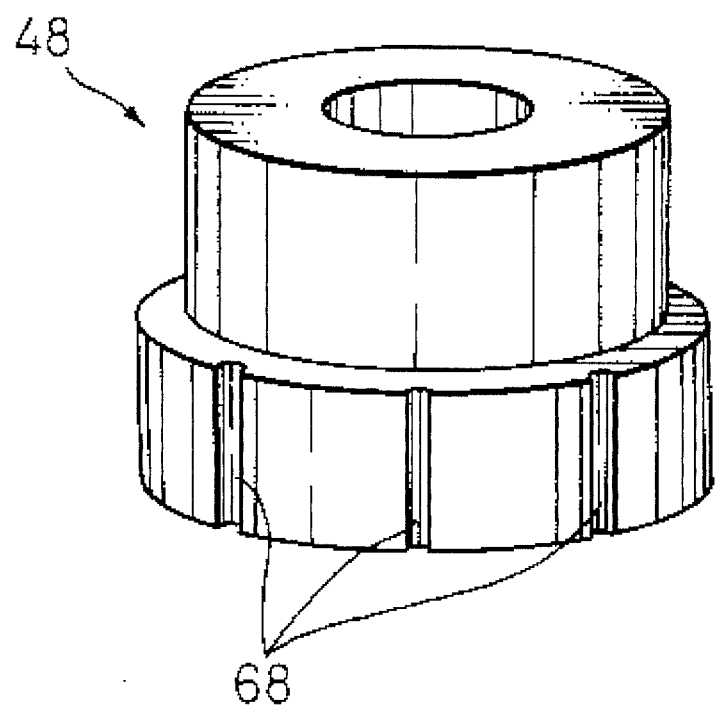
FIG. 4b is an enlarged perspective view of another modification of a spacing element.

The spacing element 48 may have a cylindrical shape as shown in FIG. 4a or a stepped cylindrical shape as shown in FIG. 4b. In either case, the outer diameter of one axial end face of the spacing element 48 is generally equal to the outer diameter of the laminated core member 24 to be cast. Also, it is preferred that, as seen from an embodiment of FIG. 1, the outer diameter of the other axial end face of the spacing element 48 is generally equal to the outer diameter of the flange 36 of the lid element 32 in order that the large holding force is caused by the holding member 22 and the pressure of the molten metal in the casting process is received only by the holding member 22. Further, it is preferred that the spacing element 48 made of metallic material such as iron is heat treated by a method such as quenching, particularly on the annular end face 56, because the end face comes into contact with the high temperature molten metal in the casting process.

As mentioned above, by using the spacing element 48, the holding force caused by the holding member 22 is surely transferred to the laminated core member 24 and the balancing ring member 40, 42, the pouring pressure in casting process is surely received by the holding member, and the optimum air draining passage is easily obtained, whereby it is possible to carry out an accurate and high-quality casting process to the same degree as in the conventional method. Therefore, supposing the axial length of the laminated core member (i.e., a laminated core member 1) defined by the mold 20 and holding member 22 which uses no spacing member 48 produces an induction motor with a desired maximum output, it is possible to form the various kinds of squirrel-cage rotors to be used in low-power motors using the common mold 20 and the common holding member 22.

Figure 5:
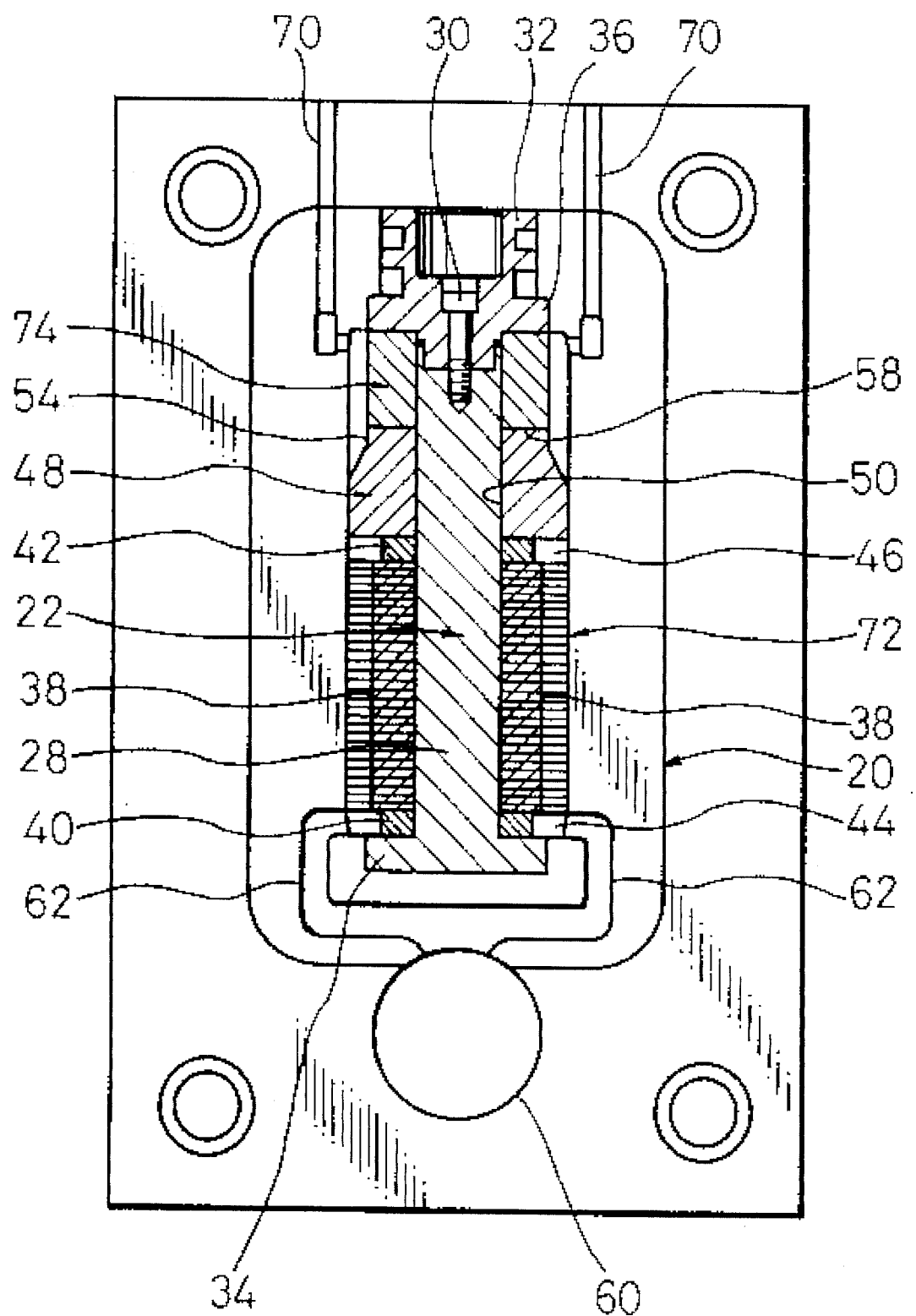
FIG. 5 is a sectional elevation view of a laminated core member produced by a method according to another embodiment of the present invention, shown with a mold, a holding member and a spacing element.

Alternatively, as shown in FIG. 5, it is also possible to integrally form a conductor portion to a laminated core member 72 having an axial length shorter than the laminated core member 24 of FIG. 1, by using two spacing elements having different shapes shown in FIG. 5 identical to the components shown in FIG. 1 are indicated by the same reference numerals, and the description thereof is omitted. One of the two spacing elements is the spacing element 48 used in the method of FIG. 1, and is disposed in contact with a balancing ring member 42 adjacent to the upper axial end face of the laminated core member 72. The other spacing element 74 has an inner diameter equal to that of the center through hole 50, an outer diameter equal to that of the smaller diameter portion 54 of the spacing element 48 and a thickness (or axial length) equal to the difference between the axial lengths of the laminated core members 24, 72. The spacing element 74 is fitted to the sleeve element 28 of the holding member 22, and is brought into close contact with the annular end face 58 of the spacing element 48 and the flange 36 of the lid element 32 at each axial end face thereof. It will be clearly understood that the same effects as the embodiment of FIG. 1 can be obtained by using these two spacing elements 48, 74. Further, the spacing element 74 does not come into direct contact with the molten metal in the casting process, and thus it is not necessary to apply a heat treatment to the spacing element.

In the above-mentioned embodiments, the mold is described as one wherein a laminated core member is supported with the axis thereof vertical and a molten metal is fed in a horizontal direction and fills the mold in a vertical direction opposite to gravity. However, the present invention is not limited to such a structure, and may be applied to a mold in which a laminated core member is supported horizontally and a molten metal fills the mold in a horizontal direction.

As is clear from the above description, according to the present invention, a spacing element with a simple structure makes it possible to accurately cast a conductor portion onto laminated core members having various axial lengths by using a common mold and holding member. The cost required for preparing various spacing elements is obviously lower than the cost required for various holding members and molds. Thus, according to the present invention, induction motors including rotors with optimum sizes corresponding to various outputs can be easily produced, and consequently, the acceleration properties of the induction motors can be improved.

We claim:

1. A method of producing a squirrel-cage rotor, for an induction motor, which includes a laminated core member made by stacking magnetic lamination and a conductor portion formed integrally with the laminated core member, comprising the steps of:

a) providing a holding member, comprising a lid and a first flange, wherein said lid comprises a second flange, wherein said holding member can hold a predetermined axial-length laminated core member by pressing down upon both axial end faces thereof;

b) providing a mold which can accommodate said holding member holding said predetermined axial-length laminated core member so as to define a cavity corresponding to a conductor portion to be formed integrally with said laminated core member;

c) fitting a short laminated core member having an axial length shorter than said predetermined axial-length laminated core member to said holding member in such a manner as to define a cavity corresponding to a desired conductor portion when being accommodated in said mold;

d) disposing a spacing element having an axial length generally equal to a difference between axial lengths of said predetermined axial-length laminated core member and said shorter laminated core member at a position between one axial end face of said shorter laminated core member and said first and second flanges of said holding member opposed to said one axial end face, so that said shorter laminated core member and said spacing element are held by said holding member;

e) introducing said shorter laminated core member and said spacing element, both held by said holding member, into said mold in such a manner as to define said cavity corresponding to said desired conductor portion wherein said spacing element disposed adjacent to said one axial end face of said shorter laminated core member defines an end wall of said mold cavity;

f) pouring a molten metal into said cavity corresponding to said desired conductor portion defined in said mold; and g) setting said molten metal in said mold so that said desired conductor portion is integrally formed with said shorter laminated core member.

2. A method as set forth in claim 1, wherein said step c) includes a step of arranging balancing ring members in contact with respective axial end faces of said shorter laminated core member.

3. A method as set forth in claim 1, wherein said step d) includes a step of disposing a plurality of spacing elements having different shapes and dimensions at a position between one axial end face of said shorter laminated core member and a portion of said holding member opposed to said one axial end face.

4. A device for producing a squirrel-cage rotor, for an induction motor, which includes a laminated core member made by stacking magnetic lamination and a conductor portion formed integrally with the laminated core member, comprising:

a holding member, comprising a lid and a first flange, wherein said lid comprises a second flange, wherein said holding member can hold a predetermined axial-length laminated core member by pressing down upon both axial end faces thereof;

a mold which can accommodate said holding member holding said predetermined axial-length laminated core member so as to define a cavity corresponding to a conductor portion to be formed integrally with said laminated core member; and a spacing element having an axial length generally equal to a difference between axial lengths of said predetermined axial-length laminated core member and a shorter laminated core member having an axial length shorter than said predetermined axial-length laminated core member, said spacing element being disposed at a position between one axial end face of said shorter laminated core member and said first and second flanges of said holding member opposed to said one axial end face so as to be held together with said shorter laminated core member by said holding member;

whereby said shorter laminated core member and said spacing element, both held by said holding member, are accommodated in said mold in such a manner that a cavity corresponding to a desired conductor portion is defined and wherein an end wall of said cavity is further defined by said spacing element disposed adjacent to said axial end face of said shorter laminated core, and said desired conductor portion is formed integrally with said shorter laminated core member by pouring a molten metal into said cavity.

5. A device as set forth in claim 4, comprising a plurality of spacing elements having different shapes and dimensions, and disposed in a mutually adjacent manner at a position between one axial end face of said shorter laminated core member and a portion of said holding member opposed to said one axial end face.

6. A device as set forth in claim 4, further comprising applying a heat treatment to an axial end face of said spacing element, said axial end face being opposed to said shorter laminated core member.

7. A device as set forth in claim 4, wherein an axially extending groove is provided on an outer surface of said spacing element.

* * * * *